US006338794B1

(12) United States Patent
Khare

(10) Patent No.: US 6,338,794 B1
(45) Date of Patent: Jan. 15, 2002

(54) DESULFURIZATION WITH ZINC TITANATE SORBENTS

(75) Inventor: Gyanesh P. Khare, Bartlesville, OK (US)

(73) Assignee: Phillips Petroleum Company, Bartlesville, OK (US)

( * ) Notice: Subject to any disclaimer, the term of this patent is extended or adjusted under 35 U.S.C. 154(b) by 0 days.

(21) Appl. No.: 09/431,370

(22) Filed: Nov. 1, 1999

(51) Int. Cl.$^7$ ................................................ C10G 29/04
(52) U.S. Cl. ........................ 208/247; 208/295; 208/296; 208/299; 208/244; 208/246; 208/249
(58) Field of Search .................................. 208/295, 296, 208/299, 244, 246, 249, 247; 585/820

(56) References Cited

U.S. PATENT DOCUMENTS

| 1,151,157 A | * | 8/1915 | Kidd ............................ 423/230 |
| 4,287,050 A | | 9/1981 | Eastman et al. ............. 208/215 |
| 4,313,017 A | * | 1/1982 | McGinnis et al. ........... 585/266 |
| 4,313,820 A | | 2/1982 | Farha, Jr. et al. ............. 208/213 |
| 4,347,811 A | | 9/1982 | Lee .............................. 123/1 A |
| 4,371,507 A | | 2/1983 | Farha, Jr. et al. ............. 423/230 |
| 4,376,698 A | * | 3/1983 | Gardner et al. .............. 208/215 |
| 4,419,968 A | | 12/1983 | Lee .................................. 123/3 |
| 4,522,709 A | * | 6/1985 | Aldag, Jr. et al. ........ 208/216 R |
| 4,652,546 A | * | 3/1987 | Aldag, Jr. et al. ........... 502/307 |
| 4,655,906 A | * | 4/1987 | Bjornson et al. ............. 208/217 |
| 4,693,991 A | * | 9/1987 | Bjorson et al. ............... 502/220 |
| 4,707,246 A | * | 11/1987 | Gardner et al. .......... 208/251 H |
| 4,725,415 A | * | 2/1988 | Kidd ............................ 423/230 |
| 4,762,814 A | * | 8/1988 | Parrott et al. ................ 502/211 |
| RE33,393 E | * | 10/1990 | Kidd ............................ 423/230 |
| 4,977,123 A | | 12/1990 | Flytzani-Stephanopoulos et al. ..... 502/84 |
| 4,990,318 A | * | 2/1991 | Kidd ............................ 423/230 |
| 5,045,522 A | * | 9/1991 | Kidd ............................ 502/405 |
| 5,254,516 A | | 10/1993 | Gupta et al. ................... 502/84 |
| 5,714,431 A | | 2/1998 | Gupta et al. ................. 502/400 |

* cited by examiner

Primary Examiner—Nadine Preisch
(74) Attorney, Agent, or Firm—Jack E. Phillips

(57) ABSTRACT

Particulate sorbent compositions comprising zinc titanate support having thereon a substantially reduced valence promotor metal selected from the group consisting of cobalt, nickel, iron, manganese, copper, molybdenum, tungsten, silver, tin and vanadium or mixtures thereof provide a system for the desulfurization of a feed stream of cracked-gasolines or diesel fuels in a desulfurization zone by a process which comprises contacting such feed streams in a desulfurization zone with a particulate sorbent composition followed by separation of the resulting low sulfur-containing steam and sulfurized sorbent and thereafter regenerating and activating the separated sorbent before recycle of same to the desulfurization zone.

8 Claims, No Drawings

DESULFURIZATION WITH ZINC TITANATE SORBENTS

FIELD OF THE INVENTION

This invention relates to the removal of sulfur from fluid streams of cracked-gasolines and diesel fuels. In another aspect this invention relates to sorbent compositions suitable for use in the desulfurization of fluid streams of cracked-gasolines and diesel fuel. A further aspect of this invention relates to a process for the production of sulfur sorbents for use in the removal of sulfur bodies from fluid streams of cracked gasolines and diesel fuels.

BACKGROUND OF THE INVENTION

The need for cleaner burning fuels has resulted in a continuing world wide effort to reduce sulfur levels in gasoline and diesel fuels. The reducing of gasoline and diesel sulfur is considered to be a means for improving air quality because of the negative impact the fuel sulfur has on the performance of automotive catalytic converters. The presence of oxides of sulfur in automotive engine exhaust inhibits and may irreversibly poison noble metal catalysts in the converter. Emissions from an inefficient or poisoned converter contain levels of non-combusted, non-methane hydrocarbon and oxides of nitrogen and carbon monoxide. Such emissions are catalyzed by sunlight to form ground level ozone, more commonly referred to as smog.

Most of the sulfur in gasoline comes from the thermally processed gasolines. Thermally processed gasolines such as, for example, thermally cracked gasoline, visbreaker gasoline, coker gasoline and catalytically cracked gasoline (hereinafter collectively called "cracked-gasoline" contains in part olefins, aromatics, and sulfur-containing compounds.

Since most gasolines, such as for example automobile gasolines, racing gasolines, aviation gasoline and boat gasolines contain a blend of at least in part cracked-gasoline, reduction of sulfur in cracked-gasoline will inherently serve to reduce the sulfur levels in such gasolines.

The public discussion about gasoline sulfur has not centered on whether or not sulfur levels should be reduced. A consensus has emerged that lower sulfur gasoline reduces automotive emissions and improves air quality. Thus the real debate has focused on the required level of reduction, the geographical areas in need of lower sulfur gasoline and the time frame for implementation.

As the concern over the impact of automotive air pollution continues, it is clear that further efforts to reduce the sulfur levels in automotive fuels will be required. While the current gasoline products contain about 330 part per million with continued efforts by the Environmental Protection Agency to secure reduced levels, it has been estimated that gasoline will have to have less than 50 part per million of sulfur by the year 2010. (See Rock, K. L., Putman M., Improvements in FCC Gasoline Desulfurization via Catalytic Distillation" presented at the 1998 National Petroleum Refiners Association Annual Meeting (AM-98-37).

In view of the ever increasing need to be able to produce a low sulfur content automotive fuel, a variety of processes have been proposed for achieving industry compliance with the Federal mandates.

One such process which has been proposed for the removal of sulfur from gasoline is called hydrodesulfurization. While hydrodesulfurization of gasoline can remove sulfur-containing compounds, it can result in the saturation of most, if not all, of the olefins contained in the gasoline. This saturation of olefins greatly affects the octane number (both the research and motor octane number) by lowering it. These olefins are saturated due to, in part, the hydrodesulfurization conditions required to remove thiophenic compounds (such as, for example, thiophene, benzothiophene, alkyl thiophenes, alkylbenzothiophenes and alkyl dibenzothiophenes), which are some of the most difficult sulfur-containing compounds to removed. Additionally, the hydrodesulfurization conditions required to remove thiophenic compounds can also saturate aromatics.

In addition to the need for removal of sulfur from cracked-gasolines, there is also presented to the petroleum industry a need to reduce the sulfur content of diesel fuels. In removing sulfur from diesel by hydrodesulfurization, the cetane is improved but there is a large cost in hydrogen consumption. This hydrogen is consumed by both hydrodesulfurization and aromatic hydrogenation reactions.

Thus there is a need for a process wherein desulfurization without hydrogenation of aromatics is achieved so as to provide a more economical process for the treatment of diesel fuels.

As a result of the lack of success in providing successful and economically feasible process for the reduction of sulfur levels in both cracked-gasolines and diesel fuels, it is apparent that there is still needed a better process for the desulfurization of both cracked-gasolines and diesel fuels which has minimal affect of octane while achieving high levels of sulfur removal.

While it has been shown in my copending application Desulfurization and Novel Sorbents for Same Ser. No. 382,935, filed Aug. 25, 1999, that one suitable sorbent system for the desulfurization of cracked-gasolines or diesel fuels is that employing a reduced cobalt metal on a zinc oxide, silica, alumina support, there is a continuous effort to develop additional systems which permit the effecting of the desired desulfurization of such cracked-gasolines or diesel fuels and which will also provide for alternative desulfurization conditions to permit variations within the operations of the process.

Thus, it is now been discovered that as the hydrogen level in a desulfurization zone increases there is achieved an extension of the life of the sorbent system but such extended activity is at the expense of octane loss.

Similarly, as the hydrogen level in the desulfurization zone is decreased the loss of octane value is minimized but such loss is at the expense of sorbent life.

Accordingly, there is a need for a sorbent system which will permit the selection of desired conditions so as to permit optimum conditions in the desulfurization of cracked-gasolines or diesel fuels.

Such a sorbent system is provided by the present invention.

It is thus an object of the present invention to provide a novel sorbent system for the removal of sulfur from fluid streams of cracked-gasolines and diesel fuels.

Another object of this invention is to provide a process for the production of novel sorbents which are useful in the desulfurization of such fluid streams.

Another object of this invention is to provide a process for the removal of sulfur-containing compounds from cracked-gasolines and diesel fuels which minimize saturation of olefins and aromatics therein.

A still further object of this invention is to provide a desulfurized cracked-gasoline that contains less than about 100 parts per million of sulfur based on the weight of the desulfurized cracked-gasoline and which contains essentially the same amount of olefins and aromatics as were in the cracked-gasoline from which it is made.

Other aspects, objects and the several advantages of this invention will be apparent from the following description of the invention and the appended claims.

SUMMARY OF THE INVENTION

The present invention is based upon our discovery that through the use of zinc titanate as an active component in combination with a metal selected from the group consisting of cobalt, nickel, iron, manganese, copper, molydenum, tungsten, silver, tin and vanadium or a mixture thereof, where in the valence of the metal is in a substantially reduce valence state, there is provided a novel sorbent composition which permits the ready removal of organosulfur compounds from streams of cracked-gasolines or diesel fuels with a minimal effect on the octane rating of the treated stream.

Such metals as employed in the present invention can be derived from the metal per se, an oxide of the metal or a precursor for the metal oxide.

It was further discovered that through the use of the novel sorbent system of this invention which is comprised of the selected reduced valence metal and zinc titanate there is provided a sorbent system which when so desired will permit the presence of a higher hydrogen content in the desulfurization of the cracked-gasoline or diesel fuel stream without a significant loss of octane value while effecting an extension of the activity life of the sorbent.

In accordance with another aspect of the present invention there is provided a process for the preparation of a novel sorbent composition which comprises: (a) forming a dry blend of zinc oxide and titanium dioxide; (b) preparing an aqueous slurry comprising said zinc oxide titanium dioxide dry blend; (c) spray drying said aqueous slurry to produce substantially spherical particles; (d) calcining said particles under conditions to convert the zinc oxide and titanium dioxide to zinc titanate; (e) impregnating the resulting solid particulate with a metal or metal oxide promotor wherein the metal is selected from the group consisting of cobalt, nickel, iron, manganese, copper, molybdenum, tungsten, silver, tin and vanadium and combinations thereof, (f) drying the resulting impregnated solid particulate composition; (g) calcining the dried particulate composition; and, (h) reducing the calcined product with a suitable reducing agent, such as hydrogen, so as to produce a sorbent composition having a reduced promotor metal content in an amount which is sufficient to permit the removal with same of sulfur from a cracked-gasoline or diesel fuel stream.

If desired, commercially available zinc titanate can be used in the preparation of the sorbent of the present invention, in which case steps (a–d) are omitted from the overall process for sorbent preparation.

In accordance with a further aspect of the present invention there is provided a process for the desulfurization of a cracked-gasoline or diesel fuel stream which comprises desulfurizing in a desulfurization zone a cracked-gasoline or diesel fuel with a sorbent composition comprising zinc titanate and a reduced valence metal wherein such metal is selected from the group consisting of nickel, cobalt, iron, manganese, copper, molybdenum, tungsten, silver, tin, vanadium or a mixture thereof: separating the desulfurized cracked-gasoline or diesel fuel from the sulfurized sorbent, regenerating at least a portion of the sulfurized sorbent to produce a regenerated desulfurized sorbent; activating at least a portion of the regenerated sorbent to produce a reduced valence metal—zinc titanate sorbent; and thereafter returning at least a portion of the resulting reduced valence metal—zinc titanate sorbent to the desulfurization zone.

The novel sorbents of the present invention are useful for the removal of thiophenic sulfur compounds from fluid streams of cracked-gasoline or diesel fuels without having a significant adverse affect on the olefin content of such streams, thus avoiding a significant reduction of octane values of the treated stream. Moreover, the use of such novel sorbents results in a significant reduction of the sulfur content of the resulting treated fluid stream.

DETAILED DESCRIPTION OF THE INVENTION

The term "gasoline" as employed herein is intended to mean a mixture of hydrocarbons boiling from about 100° F. to approximately 400° F. or any fraction thereof. Such hydrocarbons will include, for example, hydrocarbon streams in refineries such as naphtha, straight-run naphtha, coker naphtha, catalytic gasoline, visbreaker naphtha, alkylate, isomerate or reformate.

The term "cracked-gasoline" as employed herein is intended to mean hydrocarbons boiling from about 100° F. to approximately 400° F. or any fraction thereof that are products from either thermal or catalytic processes that crack larger hydrocarbon molecules into smaller molecules. Examples of thermal processes include coking, thermal cracking and visbreaking. Fluid catalytic cracking and heavy oil cracking are examples of catalytic cracking. In some instances the cracked-gasoline may be fractionated and/or hydrotreated prior to desulfurization when used as a feed in the practice of this invention.

The term "diesel fuel" as employed herein is intended to mean a fluid composed of a mixture of hydrocarbons boiling from about 300° F. to approximately 750° F. or any fraction thereof. Such hydrocarbon streams include light cycle oil, kerosene, jet fuel, straight-run diesel and hydrotreated diesel.

The term "sulfur" as employed herein is intended to mean those organosulfur compounds such as mercaptans or those thiophenic compounds normally present in cracked gasolines which include among others thiophene, benzothiophene, alkyl thiophenes, alkyl benzothiophenes and alkyldibenzothiphenes as well as the heavier molecular weights of same which are normally present in a diesel fuel of the types contemplated for processing in accordance with the present invention.

The term "gaseous" as employed herein is intended to mean that state in which the feed cracked-gasoline or diesel fuel is primarily in a vapor phase.

The term "promotor metal or promotor metal oxide or metal oxide precursor" as employed herein is intended to mean a metal or metal oxide or a metal oxide precursor wherein the metal selected from the group consisting of cobalt, nickel, iron, manganese, copper, molybdenum, tungsten, silver, tin and vanadium as well as mixtures thereof which when the valence of the same is reduced serves to promote the removal of organosulfur compounds from a cracked-gasoline or a diesel fuel stream when contacted with same.

The term "substantially reduced metal valence" as employed herein is intended to mean that a large portion of the valence of the promotor metal component of the sorbent composition is in a substantially reduced valence state of two or less.

The zinc titanate support materials of the present invention are prepared by the process comprising (a) forming a dry blend of zinc oxide and titanium dioxide, (b) preparing an aqueous slurry comprising the blend of zinc oxide and titanium dioxide, (c) spray drying the slurry to produce particles comprising zinc oxide and titanium dioxide, (d) calcining the particles under conditions to convert the zinc oxide and titanium dioxide to zinc titanate. Optionally commercially available zinc titanate can be used in which case step (a–d) are omitted in the overall process for preparation of the sorbent composition.

In preparing the zinc titanate support there is generally employed in the formation of the dry blend of zinc oxide and titanium dioxide from about 0.2 to about 2.5 parts zinc oxide and about 1 part of titanium oxide. Generally the ratio of zinc to titanium is in the range of about 0.2 to about 3. Zinc oxide useful in the present invention typically has a particle size in the range of about 0.01 to about 5 microns. The titanium dioxide useful in the present invention typically has a particle size in the range of about 0.1 to about 2 microns.

A substantially uniform aqueous slurry is prepared using the blend of zinc oxide and titanium dioxide. In addition to the blend of zinc oxide and titanium dioxide there can be added to the slurry system, if so desired, either an organic binder or an inorganic binder. The slurry is normally prepared by adding to an aqueous solution the dry blend of zinc oxide and titanium oxide while mixing so as to provide a uniform slurry. Normally the solids concentration of the slurry is in the range of about 10 to about 40 weight percent solids.

As noted, if desired organic binders can be added to the slurry system. Such organic binders are those selected from the group consisting of hydroxypropyl methyl cellulose, polyvinyl acetate, cellulose, hydropropyl cellulose, polyvinyl alcohol, starch, lignin, sulfonate, molasses and mixtures thereof.

Such organic binders are normally employed in the form of an aqueous solution. When employed, such binders are generally present in an amount in the range of about 0.2 to about 2.0 weight percent organic binder based on the weight of the aqueous solution.

If desired, although not required in the formation of the zinc titanate support of the present invention, an inorganic binder can be employed in the slurry system. Such inorganic binders are cements, clays, which includes those selected from the group consisting of bentonite, kaolinite, forsterite, vermiculite, feldspar, Portland cement, sodium silicate, oil shale, calcium sulfate and mixtures thereof. Such inorganic binders, if employed, are generally in the range of about 1 to about 20 weight percent, preferably 5 to 10 weight percent.

The slurry, once prepared, is spray dried to produce a spherical particle. Any suitable method known to those skilled in the art for spray drying the slurry may be employed. Normally, the slurry is spray dried at a temperature in the range of about 125 to about 340° C.

Once spray dried, the resulting particulate support precursor is calcined under conditions sufficient to convert the zinc oxide and titanium dioxide to zinc titanate. Normally such calcining is carried out at a temperature in the range of about 650 to about 1100° C. for a period of time sufficient to convert the zinc oxide and titanium dioxide to zinc titanate. Such a period of time is generally in the range of from about 1 to about 4 hours.

The zinc titanate support in the formation of the novel sorbent system of the present invention is impregnated with a promotor consisting of at least one metal, metal oxide or metal oxide precursor where in said metal is selected from the group consisting of cobalt, nickel, iron, manganese, copper, molybdenum, tungsten, silver, tin and vanadium.

The impregnation of the zinc titanate with the selected promotor is carried out such that there is introduced sufficient metal that following calcination of the impregnated support and reduction of the metal thereon, there will be sufficient reduced metal to effect the removal of sulfur from streams of cracked-gasoline or diesel fuels when so treated with same in accordance with the process of the present invention.

Following the impregnation of the particulate zinc titanate support composition with the appropriate metal promotor the resulting impregnated particulate is then subjected to drying and calcination prior to the subjecting of the calcined particulate to reduction with a reducing agent, preferably hydrogen.

The promotor metal can be added to the particulated support by impregnation of the support with a solution either aqueous or organic that contains the promotor metal, metal oxide and metal containing compound. In general, the impregnation with the promotor is carried out so as to form a resulting particulate composition of zinc titanate and the promotor metal, metal oxide or metal precursor prior to the drying and calcination of the resulting impregnated support.

The impregnation solution is any aqueous solution and amounts of such solution which suitably provides for the impregnation of the zinc titanate to give an amount of promotor in the final sorbent composition to provide when reduced a reduced metal content sufficient to permit the removal of sulfur from streams of cracked-gasoline or diesel fuels when so treated with same.

Once the promotor has been incorporated into the particulate zinc titanate, the desired reduced valence sorbent is prepared by drying the resulting composition followed by calcination and thereafter subjecting the resulting calcined composition to reduction with a suitable reducing agent, preferably, hydrogen, so as to produce a composition having a substantial reduced valence metal content therein with such reduced valence metal content being present in an amount to permit the removal with same of sulfur from a cracked-gasoline or diesel fuel fluid stream.

The solid reduced metal sorbents of this invention are compositions that have the ability to react with and/or chemisorb with organosulfur compounds, such as thiophenic compounds. Also, the novel sorbent compositions serve to remove diolefins and other gum forming compounds from the cracked-gasoline.

The solid reduced metal sorbent of this invention is comprised of a metal selected from the group consisting of cobalt, nickel, iron, manganese, copper, molybdenum, tungsten, silver, tin and vanadium and mixtures thereof that is in a substantially reduced valence state, of two or less. Presently the preferred reduced metal is nickel. The amount of reduced metal in the solid reduced metal zinc titanate sorbents of this invention is that amount which will permit the removal of sulfur from a cracked-gasoline or diesel fuel fluid stream. Such amounts are generally in the range of from about 5 to about 50 weight percent of the total weight of the sorbent composition. Presently, it is preferred that the reduced promotor metal be present in an amount in the range of from about 15 to about 40 weight percent of promotor metal in the sorbent composition.

In one presently preferred embodiment of the present invention, the reduced metal is nickel and is present in an amount in the range of from about 10 to about 30 weight percent and the nickel has been substantially reduced to zero valence.

In another presently preferred embodiment of this invention there is employed a zinc titanate support having about 12 weight percent nickel thereon prior to reduction.

Another presently preferred embodiment of this invention the zinc titanate support has a nickel content prior to reduction in an amount of about 24 weight percent.

From the above, it can be appreciated that the sorbent compositions which are useful in the desulfurization process of this invention can be prepared by a process when using zinc oxide and titanium oxide which comprises:

(a) forming a dry blend of zinc oxide and titanium dioxide;

(b) preparing an aqueous slurry comprising the dry blend of zinc oxide and titanium dioxide;

(c) spray drying the slurry to produce particles comprising zinc oxide and titanium dioxide;

(d) calcining the particles under conditions to convert the zinc oxide and titanium dioxide to zinc titanate;

(e) impregnating the resulting calcined particulate with a promotor having as a metal component at least one metal selected from the group consisting of cobalt, nickel, iron, manganese, copper, molybdenum, tungsten, silver, tin and vanadium;

(f) drying the resulting impregnated solid particulate composition;

(g) calcining the dried particulate composition; and, (h) reducing the calcined product with a suitable reducing agent, such as hydrogen, so as to produce a sorbent composition having a reduced promotor metal content in an amount which is sufficient to permit the removal with same of sulfur from a cracked-gasoline or diesel fuel stream when contacted with the resulting substantial reduced valence metal containing sorbent.

The process to use the novel sorbent to desulfurize cracked-gasolines or diesel fuels to provide a desulfurized cracked-gasoline or diesel fuel comprises:

(a) desulfurizing in a desulfurization zone a cracked-gasoline or diesel fuel with a solid reduced promotor metal-containing sorbent;

(b) separating the desulfurized cracked-gasoline or desulfurized diesel fuel from the resulting sulfurized solid reduced promotor metal-containing sorbent;

(c) regenerating at least a portion of the sulfurized solid reduced promotor metal containing sorbent to produce a regenerated desulfurized solid promotor metal-containing sorbent;

(d) reducing at least a portion of the regenerated desulfurized solid promotor metal-containing sorbent to produce a solid reduced promotor metal-containing sorbent; and, thereafter (e) returning at least a portion of the regenerated solid reduced promotor metal-containing sorbent to the desulfurization zone.

The desulfurization step (a) of the present invention is carried out under a set of conditions that includes total pressure, temperature, weight hourly space velocity and hydrogen flow. These conditions are such that the solid reduced metal-containing sorbent can desulfurize the cracked-gasoline or diesel fuel to produce a desulfurized cracked-gasoline or desulfurized diesel fuel and a sulfurized sorbent.

In carrying out the desulfurization step of the process of the present invention, it is preferred that the feed cracked-gasoline or diesel fuel be in a vapor phase. However, in the practice of the invention it is not essential, albeit preferred, that the feed be totally in a vapor or gaseous state.

The total pressure can be in the range of about 15 psia to about 1500 psia. However, it is presently preferred that the total pressure be in a range of from about 50 psia to about 500 psia.

In general, the temperature should be sufficient to keep the cracked-gasoline or diesel fuel essentially in a vapor phase. While such temperatures can be in the range of from about 100° F. to about 1000° F., it is presently preferred that the temperature be in the range of from about 400° F. to about 800° F. when treating as cracked-gasoline and in the range of from about 500° F. to about 900° F. when the feed is a diesel fuel.

Weight hourly space velocity (WHSV) is defined as the pounds of hydrocarbon feed per pound of sorbent in the desulfurization zone per hour. In the practice of the present invention, such WHSV should be in the range of from about 0.5 to about 50, preferably about 1 to about 20 $hr^{-1}$.

In carrying out the desulfurization step, it is presently preferred that an agent be employed which interferes with any possible chemisorbing or reacting of the olefinic and aromatic compounds in the fluids which are being treated with the solid reduced nickel-containing sorbent. Such an agent is presently preferred to be hydrogen.

Hydrogen flow in the desulfurization zone is generally such that the mole ratio of hydrogen to hydrocarbon feed is the range of about 0.1 to about 10, and preferably in the range of about 0.2 to about 3.0.

The desulfurization zone can be any zone wherein desulfurization of the feed cracked-gasoline or diesel fuel can take place. Examples of suitable zones are fixed bed reactors, moving bed reactors, fluidized bed reactors and transport reactors. Presently, a fluidized bed reactor or a fixed bed reactor is preferred.

If desired, during the desulfurization of the vaporized fluids, diluents such as methane, carbon dioxide, flue gas, and nitrogen can be used. Thus it is not essential to the practice of the process of the present invention that a high purity hydrogen be employed in achieving the desired desulfurization of the cracked-gasoline or diesel fuel.

It is presently preferred when utilizing a fluidized system that a solid reduced metal sorbent be used that has a particle size in the range of about 20 to about 1000 micrometers. Preferably, such sorbents should have a particle size of from about 40 to about 500 micrometers. When a fixed bed system is employed for the practice of the desulfurization process of this invention, the sorbent should be such as to have a particle size in the range of about 1/32 inch to about 1/2 inch diameter.

It is further presently preferred to use solid reduced metal containing sorbents that have a surface area of from about 1 square meter per gram to about 1000 square meters per gram of solid sorbent.

The separation of the gaseous or vaporized desulfurized fluids and sulfurized sorbent can be accomplished by any means known in the art that can separate a solid from a gas. Examples of such means are cyclonic devices, settling chambers or other impingement devices for separating solids and gases. The desulfurized gaseous cracked-gasoline or desulfurized diesel fuel can then be recovered and preferably liquefied.

The gaseous cracked-gasoline or gaseous diesel fuel is a composition that contains in part, olefins, aromatics and sulfur-containing compounds as well as paraffins and naphthenes.

The amount of olefins in gaseous cracked-gasoline is generally in the range of from about 10 to 35 weight percent based on the weight of the gaseous cracked-gasoline. For diesel fuel there is essentially no olefin content.

The amount of aromatics in gaseous cracked-gasoline is generally in the range of about 20 to about 40 weight percent based on the weight of the gaseous cracked gasoline. The amount of aromatics in gaseous diesel fuel is generally in the range of about 10 to about 90 weight percent.

The amount of sulfur in cracked-gasolines or diesel fuels can range from about 100 parts per million sulfur by weight of the gaseous cracked-gasoline to about 10,000 parts per million sulfur by weight of the gaseous cracked-gasoline and from about 100 parts per million to about 50,000 parts per million for diesel fuel prior to the treatment of such fluids with the sorbent system of the present invention.

The amount of sulfur in cracked-gasolines or in diesel fuels following treatment of same in accordance with the desulfurization process of this invention is less than 100 parts per million.

In carrying out the process of this invention, if desired, a stripper unit can be inserted before the regenerator for regeneration of the sulfurized sorbent which will serve to remove a portion, preferably all, of any hydrocarbons from the sulfurized sorbent or before the hydrogen reduction zone so as to remove oxygen and sulfur dioxide from the system prior to introduction of the regenerated sorbent into the sorbent activation zone. The stripping comprises a set of conditions that includes total pressure, temperature and stripping agent partial pressure.

Preferably the total pressure in a stripper, when employed, is in a range of from about 25 psia to about 500 psia.

The temperature for such strippers can be in the range of from about 100° F. to about 1000° F.

The stripping agent is a composition that helps to remove hydrocarbons from the sulfurized solid sorbent. Presently, the preferred stripping agent is nitrogen.

The sorbent regeneration zone employs a set of conditions such that at least a portion of the sulfurized sorbent is desulfurized.

The total pressure in the regeneration zone is generally in the range of from about 10 to about 1500 psia. Presently preferred is a total pressure in the range of from about 25 psia to about 500 psia.

The sulfur removing agent partial pressure is generally in the range of from about 1 percent to about 25 percent of the total pressure.

The sulfur removing agent is a composition that helps to generate gaseous sulfur oxygen-containing compounds such a sulfur dioxide, as well as to burn off any remaining hydrocarbon deposits that might be present. Currently, oxygen-containing gases such as air are the preferred sulfur removing agent.

The temperature in the regeneration zone is generally from about 100° F. to about 1500° F. with a temperature in the range of about 800° F. to about 1200° F. being presently preferred.

The regeneration zone can be any vessel wherein the desulfurizing or regeneration of the sulfurized sorbent can take place.

The desulfurized sorbent is then reduced in an activation zone with a reducing agent so that at least a portion of the metal promotor content of the sorbent composition is reduced to produce a solid reduced promotor metal sorbent having an amount of reduced metal therein to permit the removal of sulfur components from a stream of cracked-gasoline or diesel fuel.

In general, when practicing the process of this invention, the reduction of the desulfurized solid promotor metal-containing sorbent is carried out at a temperature in the range of about 100° F. to about 1500° F. and a pressure in the range of about 15 to 1500 psia. Such reduction is carried out for a time sufficient to achieve the desired level of metal reduction in the sorbent system. Such reduction can generally be achieved in a period of from about 0.01 to about 20 hours.

Following the activation of the regenerated particulate sorbent, at least a portion of the resulting activated (reduced) sorbent can be returned to the desulfurization unit.

When carrying out the process of the present invention in a fixed bed system, the steps of desulfurization, regeneration, stripping, and activation are accomplished in a single zone or vessel.

The desulfurized cracked-gasoline resulting from the practice of the present invention can be used in the formulation of gasoline blends to provide gasoline products suitable for commercial consumption.

The desulfurized diesel fuels resulting from the practice of the present invention can likewise be used for commercial consumption where a low sulfur-containing fuel is desired.

EXAMPLES

The following examples are intended to be illustrative of the present invention and to teach one of ordinary skill in the art to make and use the invention. These examples are not intended to limit the invention in any way.

Example I

A slurry prepared by mixing 6.5 weight percent titanium dioxide, 13.5 weight percent zinc oxide and 80 weight percent water was spray dried using a Niro spray dryer. The resulting 90 micron average particle size product was calcined at 899° C. for 3 hours.

100 grams of the resulting calcined zinc titanate product was impregnated with 59.4 grams of $Ni(NO_3)_2 \cdot 6 \, H_2O$ dissolved in 16.7 grams of deionized water. The nickel impregnated zinc titanate was then dried at 300° F. for two hours and calcined in air at 1175° F. for one hour.

The resulting calcined nickel oxide-zinc titanate sorbent was reduced in a reactor at 700° F. at a total pressure of 15 psia and a hydrogen partial pressure of 15 psi for 2.5 hours to produce a solid reduced nickel-zinc titanate sorbent wherein the nickel component of the sorbent composition was substantially reduced.

Reduction of the particulate solid calcined composition comprising zinc titanate and a nickel compound so as to obtain the desired sorbent having a reduced valence nickel content is carried out in the rector as described in Example II. Alternatively, such reduction or activation of the particulate composition to form the desired sorbent can be carried out in a separate activation or hydrogenation zone and subsequently transferred to the unit in which desulfurization of the feedstock is to be carried out.

Example II

The particulate nickel-zinc titanate sorbent as prepared in Example I was tested for its desulfurization ability as follows.

A 1-inch quartz reactor tube was loaded with the indicated amounts as noted below of the unreduced sorbent of Example I. This solid nickel zinc titanate sorbent was placed on a frit in the middle of the reactor and subjected to reduction with hydrogen as noted in Example I. Gaseous cracked-gasoline having about 340 parts per million sulfur by weight sulfur-containing compounds based on the weight of the gaseous cracked-gasoline and having about 95 weight percent thiophenic compounds (such as for example, alkyl benzothiophenes, alkyl thiophenes, benzothiophene and thiophene) based on the weight of sulfur-containing compounds in the gaseous cracked-gasoline was pumped upwardly through the reactor. The rate was 13.4 milliliters per hour. This produced sulfurized solid sorbent and desulfurized gaseous-cracked gasoline.

The following results were obtained:

The sulfur in gasoline was reduced from 340 ppm to 90–130 ppm under the conditions noted in Table 1.

After Run 1, the sulfurized sorbent was subjected to desulfurizing conditions that included a temperature of 900° F., a total pressure of 15 psia and an oxygen partial pressure of 0.6 to 3.1 psi for a time period of 1–2 hours. Such conditions are hereinafter referred to as "regeneration conditions" to produce a desulfurized nickel-containing sorbent. This sorbent was then subjected to reducing conditions that included a temperature of 700° F., a total pressure of 15 psia and a hydrogen partial pressure of 15 psi for a time period of 1.0 hours. Such conditions are hereinafter referred to as "reducing conditions".

The resulting solid reduced nickel metal sorbent composition was then used in Runs 2 and 3. After each run the sulfurized sorbent was subjected to "regeneration" and "reducing" conditions as described above. In Runs 2 and 3 the sulfur contents of the feed were reduced to 40–85 ppm.

The feed employed in these runs had a Motor Octane Number (MON) of 80. The composite MON for Run 3 was 80.6. When compared with the MON value of the feed it can be seen that a gain of octane was observed. The results of this series of runs is set forth in Table 1:

TABLE 1

| Reactor Conditions | Run Number | | |
|---|---|---|---|
| | 1 | 2 | 3 |
| Amount | 10 | 10 | 10 |
| TP[1] | 15 | 15 | 15 |
| HPP[2] | 6.6 | 6.6 | 6.6 |
| ° F. | 600 | 600 | 600 |
| TOS[3] | | Sulfur[4] | |
| 1 | 90 | 40 | 40 |
| 2 | 125 | 50 | 65 |
| 3 | 130 | 50 | 75 |
| 4 | 105 | 55 | 85 |

[1]Total pressure in psia.
[2]Hydrogen partial pressure in psi.
[3]The time on stream in hours.
[4]The amount of sulfur-containing compounds left in the desulfurized cracked-gasoline in parts per million sulfur by weight based on the weight of the desulfurized cracked-gasoline.

Example III

A slurry prepared by mixing 6.5 weight percent titanium dioxide, 13.5 weight percent zinc oxide and 80 weight percent water is spray dried using a Niro spray dryer. The resulting 90 micron average particle size product was calcined at 899° C. for 3 hours.

100 grams of the resulting calcined zinc titanate product was impregnated with 59.4 grams of $Ni(NO_3)_2 \cdot 6H_2O$ dissolved in 16.7 grams of deionized water. The nickel impregnated zinc titanate material was then dried at 300° F. for 2 hours and calcined in air at 1175° F. for one hour.

50 grams of the nickel impregnated zinc titanate sorbent was subjected to a second impregnation with 29.7 grams of the nickel nitrate hexahydrate dissolved in 4 grams of deionized water heated to 180° F. After the second impregnation once again the impregnated sorbent was dried at 300° F. for one hour and then calcined at 1175° F. for one hour.

Example IV

The particulate solid composition as prepared in Example III was tested for its desulfurization ability as follows.

A 1-inch quartz reactor tube was loaded with the indicated amounts as noted below of the sorbent of Example III. This solid nickel oxide-zinc titanate sorbent was placed on a frit in the middle of the reactor and subjected to an in-situ reduction with hydrogen at a particle pressure of 15 psi and a total pressure of 15 psia for about 0.02 hours and then gaseous cracked-gasoline having about 340 parts per million sulfur by weight sulfur-containing compounds based on the weight of the gaseous cracked-gasoline and having about 95 weight percent thiphenic compounds (such as, for example, alkyl benzothiophenes, alkyl thiophenes, benzothiophene and thiophene) based on the weight of sulfur-containing compounds in the gaseous cracked-gasoline was pumped upwardly through the reactor. The rate was 13.4 milliliters per hour. This produced sulfurized solid sorbent and desulfurized gaseous cracked-gasoline.

The following results were obtained:

The sulfur content of the feed was reduced to 5 ppm.

After Run 1, the sulfurized sorbent was subjected to desulfurizing conditions that included a temperature of 900° F., a total pressure of 15 psia and an oxygen partial pressure of 0.6 to 3.1 psi for a time period of 1–2 hours. Such conditions are hereinafter referred to as "regeneration conditions" to produce a desulfurized nickel-containing sorbent. This sorbent was then subjected to reducing conditions that included a temperature of 700° F., a total pressure of 15 psia and a hydrogen partial pressure of 15 psi for a time period of 0.02 hours. Such conditions are hereinafter referred to as "reducing conditions".

The resulting solid reduced nickel metal sorbent composition was then used in Run 2. This run once again resulted in the reduction of sulfur content from 340 ppm to 5 ppm indicating the sorbent can be regenerated without a loss in its sulfur removal reactivity.

After Run 2, the sulfurized sorbent was then subjected to the desulfurizing conditions and the reducing conditions. However, in this case the reduction was carried out for 0.5 hours using a hydrogen gas at a partial pressure of 15 psi and a total pressure of 15 psia.

This regenerated and reduced sorbent was then used in Run 3 resulting in the removal of sulfur to 5–10 ppm.

After Run 3, the sulfurized sorbent was subjected to the desulfurizing conditions and the reducing conditions. This solid nickel reduced metal sorbent was then used in Run 4 and a sulfur removal to 5 ppm was observed.

After Run 4, the sulfurized sorbent was subjected to the regeneration conditions. This nickel oxide-zinc titanate sorbent was then used in Run 5. In Run 5, when the hydrogen partial pressure was zero and no reduction performed, almost no removal of sulfur from the feed was observed indicating the need for a substantially reduced metal sorbent to effectively remove sulfur from gasoline feed.

Run 6 is a repeat of Run 3 and Runs 7 and 8 are a repeat of Run 2 which confirm that sorbent can be repeatedly regenerated without any appreciable loss in its effectiveness to remove sulfur from gasoline. In Run 9, the hydrogen partial pressure was reduced to 6.2 psi resulting in a sulfur reduction from 340 ppm in the feed to about 35–110 ppm in the product desulfurized gasoline.

The feed employed in these runs had a Motor Octane Number (MON) of 80 and a Research Octane Number (RON) of 91.1. The composite MON and RON for a product from Runs 1 and 2 was 80.8 and 90.9 respectively. The composite MON and RON for Runs 3 and 4 was 80.8 and 91.2 respectively. When compared with the MON and RON value of the feed it can be seen that no significant loss of RON but a slight gain in MON was observed.

The feed employed in these runs had an olefin content of 24.9 weight percent, while the olein content in the product from Runs 6, 7 and 9 were 20.7, 20.7 and 20.5 wt % respectively. This indicates an unique feature of the invention sorbent in that the olefin content of the product is unaffected by an increase in the partial pressure of hydrogen from 6.2 psi (Run 9) to 13.2 psi (Runs 6 and 7) during desulfurization process wherein the total pressure was 15 psia.

The Motor Octane Number of the desulfurized product from Runs 6, 7 and 9 were 80.2, 79.9 and 80.4 respectively further confirming that little or no loss in octane is effected when the hydrogen partial pressure is increased in Runs 6 and 7 versus Run 9.

The results of this series of runs is set forth in Table 2.

TABLE 2

| Reactor Conditions | Run Number | | | | | | | | |
|---|---|---|---|---|---|---|---|---|---|
| | 1 | 2 | 3 | 4 | 5 | 6 | 7 | 8 | 9 |
| Amount (grams) | 10 | 10 | 10 | 10 | 10 | 10 | 10 | 10 | 10 |
| TP[1] | 15 | 15 | 15 | 15 | 15 | 15 | 15 | 15 | 15 |
| HPP[2] | 13.2 | 13.2 | 13.2 | 13.2 | 0 | 13.2 | 13.2 | 13.2 | 6.6 |
| °F. | 700 | 700 | 700 | 700 | 700 | 700 | 700 | 700 | 700 |
| TOS[3] | | | | | Sulfur[4] | | | | |
| 1 | 25 | 5 | 5 | 5 | 320 | 5 | 20 | 30 | 110 |
| 2 | 5 | 5 | 5 | 5 | 320 | 5 | 5 | 10 | 35 |
| 3 | 5 | 5 | 10 | | 325 | 10 | 5 | 5 | 60 |
| 4 | 5 | 5 | 10 | | 325 | 15 | 5 | 5 | 75 |

[1]Total pressure in psia.
[2]Hydrogen partial pressure in psi.
[3]The time on stream in hours.
[4]The amount of sulfur-containing compounds left in the desulfurized cracked-gasoline in parts per million sulfur by weight based on the weight of the desulfurized cracked-gasoline.

The specific examples herein disclosed are to be considered as being primarily illustrative. Various changes beyond those described will no doubt occur to those skilled in the art; and such changes are to be understood as forming a part of this invention insofar as they fall within the spirit and scope of the appended claims.

What is claimed is:

1. A process for the removal of sulfur from a stream of a cracked-gasoline or a diesel fuel which comprises:

(a) contacting said stream with a sorbent composition comprising zinc titanate, and a metal, metal oxide or metal oxide precursor promotor wherein said metal is selected from the group consisting of cobalt, nickel, iron, manganese, copper, molybdenum, tungsten, silver, tin and vanadium and mixtures thereof and wherein said promotor metal is present in a substantially reduced valence state of two or less and in an amount which will effect the removal of sulfur from a stream of cracked-gasoline or diesel fuel when contacted with said sorbent composition under desulfurization conditions, such contacting being carried out in a desulfurization zone under conditions such that there is formed a desulfurized fluid stream of cracked-gasoline or diesel fuel and a sulfurized sorbent;

(b) separation the resulting desulfurized fluid stream from said sulfurized sorbent;

(c) regenerating at least a portion of the separation sulfurized sorbent in a regeneration zone so as to remove at least a portion of the sulfur absorbed thereon;

(d) reducing the resulting desulfurized sorbent in an activation zone so as to provide a reduced valence state of two or less metal promotor content therein which will affect the removal of sulfur from a stream of a cracked-gasoline or diesel fuel when contacted with same; and thereafter (e) returning at least a portion of the resulting desulfurized, reduced sorbent to said desulfurization zone.

2. A process in accordance to claim 1 wherein said desulfurization is carried out at a temperature in the range of about 100° F. to about 1000° F. and a pressure in the range of about 15 to about 1500 psia for a time sufficient to effect the removal of sulfur from said stream.

3. A process in accordance to claim 2 wherein said regeneration is carried out at a temperature in the range of about 100° F. to about 1500° F. and a pressure in the range of about 10 to about 1500 psia for a time sufficient to effect the removal of at least a portion of sulfur from the sulfurized sorbent.

4. A process in accordance with claim 3 wherein there is employed air as a regeneration agent in said regeneration zone.

5. A process in accordance with claim 2 wherein said regenerated sorbent is subjected to reduction with hydrogen in a hydrogenation zone which is maintained at a temperature in the range of about 100° F. to about 1500° F. and at a pressure in the range of about 15 to about 1500 psia and for a period of time to effect a substantial reduction of said promotor metal of said sorbent to a valence state of two or less.

6. A process in accordance with claim 5 wherein said promotor metal is nickel reduced to zero valence.

7. A process in accordance with claim 5 wherein said separated sulfurized sorbent is stripped prior to introduction into said regeneration zone.

8. A process in accordance with claim 7 wherein said regenerated sorbent is stripped prior to introduction into said activation zone.

* * * * *